(12) United States Patent
Endo et al.

(10) Patent No.: US 7,339,496 B2
(45) Date of Patent: Mar. 4, 2008

(54) GEOGRAPHIC DATA TRANSMITTING METHOD, INFORMATION DELIVERING APPARATUS AND INFORMATION TERMINAL

(75) Inventors: Yoshinori Endo, Zama (JP); Akio Sumizawa, Zama (JP)

(73) Assignee: Xanavi Informatics Corporation, Zama-shi (JP)

( * ) Notice: Subject to any disclaimer, the term of this patent is extended or adjusted under 35 U.S.C. 154(b) by 167 days.

(21) Appl. No.: 10/529,886

(22) PCT Filed: Oct. 1, 2003

(86) PCT No.: PCT/JP03/12593

§ 371 (c)(1),
(2), (4) Date: Apr. 1, 2005

(87) PCT Pub. No.: WO2004/031690

PCT Pub. Date: Apr. 15, 2004

(65) Prior Publication Data
US 2006/0007022 A1    Jan. 12, 2006

(30) Foreign Application Priority Data
Oct. 1, 2002    (JP)    ............................. 2002-288824

(51) Int. Cl.
*G08B 1/123*    (2006.01)

(52) U.S. Cl. ........................... 340/995.12; 340/995.14; 701/209

(58) Field of Classification Search ... 340/988–995.28; 701/200–226
See application file for complete search history.

(56) References Cited

U.S. PATENT DOCUMENTS

| | | | | |
|---|---|---|---|---|
| 5,568,390 A | * | 10/1996 | Hirota et al. | 701/201 |
| 5,790,973 A | * | 8/1998 | Blaker et al. | 455/456.5 |
| 5,911,773 A | * | 6/1999 | Mutsuga et al. | 701/200 |
| 6,320,518 B2 | * | 11/2001 | Saeki et al. | 340/995.12 |
| 6,559,865 B1 | * | 5/2003 | Angwin | 715/765 |
| 6,594,580 B1 | * | 7/2003 | Tada et al. | 701/211 |
| 6,636,805 B1 | | 10/2003 | Tada et al. | |
| 6,691,028 B2 | * | 2/2004 | Bullock et al. | 701/202 |
| 2001/0027376 A1 | * | 10/2001 | Tiede et al. | 701/209 |
| 2002/0165663 A1 | * | 11/2002 | Umezu et al. | 701/208 |

FOREIGN PATENT DOCUMENTS

| | | |
|---|---|---|
| JP | 2000-123295 | 4/2000 |
| JP | 2001-141490 | 5/2001 |
| JP | 2002-107169 | 4/2002 |
| JP | 2002-228480 | 8/2002 |

* cited by examiner

*Primary Examiner*—Benjamin C. Lee
(74) *Attorney, Agent, or Firm*—Crowell & Moring LLP

(57) ABSTRACT

A preferred route from a present place to a destination in decided based on geographical data including road shape information indicative of the shapes of roads and also including road connection information indicative of connection conditions between the roads, and then geographical data of areas existing within a predetermined distance from the decided preferred route are derived. Then, it is decided whether the road connection information should be deleted from the derived geographic data, and if so decided, the geographic data are transmitted with the road connection information deleted.

21 Claims, 14 Drawing Sheets

GEOGRAPHIC DATA TRANSMITTING METHOD, INFORMATION DELIVERING APPARATUS AND INFORMATION TERMINAL

INCORPORATION BY REFERENCE

The disclosure of the following priority application is herein incorporated by reference: Japanese Patent Application No. 2002-288824 filed Oct. 1, 2002

TECHNICAL FIELD

The present invention relates to a map data distribution technology whereby map data to be used at an information terminal such as a navigation apparatus installed in a vehicle are distributed through communication.

BACKGROUND ART

There are information communication navigation systems mainly comprising a navigation apparatus installed in a vehicle and an information distribution center that searches for a route to be taken to a destination and distributes map data to the navigation apparatus upon a request at the navigation apparatus. In such an information communication navigation system adopting the map data distribution method in the related art, map data obtained by slicing out a specific range corresponding to an area around the route are distributed unmodified.

DISCLOSURE OF THE INVENTION

There is a problem with the method used in the related art in that since the sliced-out map data are distributed as they are, a great volume of data must be transmitted, necessitating a significant length of time for communication and a significant communication cost particularly when the destination is far away.

The present invention reduces the volume of data to be transmitted when navigating a vehicle to a destination by providing a limited volume of information with regard to data which are not crucial for the navigation.

Accordingly, in a map data transmission method according to the present invention, a recommended route to be taken from the current position to a destination is determined based upon map data containing road shape information indicating road shapes and road connection information indicating connecting conditions with which roads are connected to one another, map data over a slicing range set within a predetermined distance from the determined recommended route are extracted from the map data, a decision is made as to whether or not to eliminate the road connection information from the extracted map data, and the road connection information is eliminated from the extracted map data and map data without the road connection information are transmitted if the results of the decision indicate that the road connection information is to be eliminated.

It is desirable that when adopting the map data transmission method the decision as to whether or not to eliminate the road connection information from the extracted map data be made in conformance to geographical conditions set with regard to the map data. In addition, the geographical conditions should include criteria such as whether or not the extracted map data are corresponding to an urban area and whether or not the extracted map data are corresponding to an area with good GPS reception, and it is desirable to eliminate the road connection information if the map data are not corresponding to an urban area or if they cover an area with good GPS reception. In addition, the road connection information corresponding to extracted data of a road that does not connect with the recommended route may be eliminated.

Alternatively, the volume of data to be transmitted may be reduced by eliminating part of the road shape information instead of the road connection information in the map data transmission method. In such a case, part of the road shape information corresponding to data on a road that does not connect with the recommended route in the extracted map data may be eliminated.

Furthermore, in the map data transmission method according to the present invention, shapes of roads on the recommended route may be simplified under predetermined conditions. Namely, part of the road shape information corresponding to a portion of the recommended route except for the portion located on the approaching side to the guidance point and within a predetermined distance from a guidance point or part of the road shape information corresponding to other roads may be eliminated.

In the data transmission method described above, information indicating that the road connection information has been eliminated should be appended. Also, the distance from the current position to the destination on the determined recommended route may be calculated and the road connection information may be eliminated if an estimated total data volume of the extracted map data obtained based upon the calculated distance is greater than a predetermined value.

The information distribution apparatus according to the present invention executes map data transmission by adopting the map data transmission method described above.

An information terminal according to the present invention includes a reception means for receiving map data transmitted from the information distribution apparatus and a display means for displaying map data corresponding to a recommended route and an area ranging within a predetermined distance from the recommended route based upon the received map data.

In another map data transmission method according to the present invention, road map data over a slicing range set within a predetermined distance from a determined recommended route are extracted based upon map data, facility data of a facility satisfying specific conditions are extracted from facility data outside the slicing range, and the road map data extracted from within the slicing range, the facility data extracted from the facility data outside the slicing range and map data of a road connecting with the facility, at least, are transmitted.

In this map data transmission method, the facility data satisfying the specific conditions mentioned above may pertain to a facility located at a point that allows the vehicle to approach the facility through a road connecting with the recommended route and to return to the recommended route through a road connecting with the recommended route. Alternatively, facility data pertaining to a type of facility suitable to be used at an estimated time point as the vehicle travels on the recommended route may be extracted. Furthermore, facility data of a refueling station may be extracted based upon an estimated traveling distance, an estimated time point or an estimated geographical position at which the remaining fuel quantity in the vehicle traveling on the recommended route is estimated to become equal to or less than a predetermined value.

Another information terminal according to the present invention includes a reception means for receiving map data transmitted by adopting the map data transmission method described above and a display means for displaying road map data taken over a slicing range containing the recommended route and set within a predetermined distance from the recommended route and a facility mark corresponding to the extracted facility data.

BEST MODE FOR CARRYING OUT THE INVENTION

First Embodiment

Figure 1:
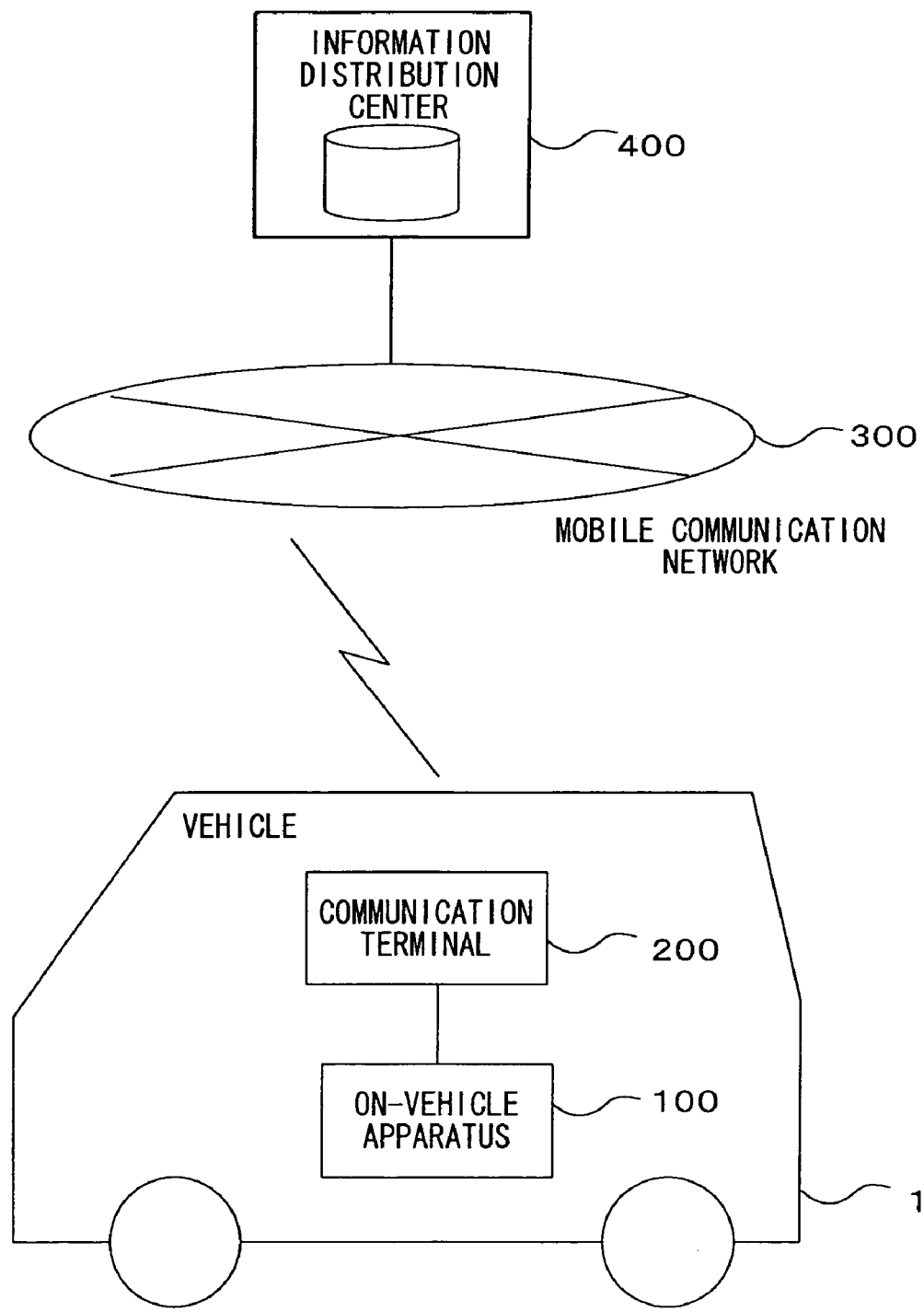
FIG. 1 is a block diagram of the configuration adopted in the map information distribution system in first through fourth embodiments.

The first embodiment in which the present invention is adopted in a map information distribution system in conjunction with a car navigation apparatus is explained in reference to FIG. 1. A car navigation apparatus (hereafter referred to as an on-vehicle apparatus) 100 installed in a vehicle 1 is connected with a communication terminal 200 through a communication cable. The communication terminal 200 is connected with an information distribution center 400 via a mobile communication network 300 through radio waves. The information distribution center 400 receives various requests from the on-vehicle apparatus 100, which are transmitted through the communication terminal 200, and provides various types of information such as map data to the on-vehicle apparatus 100 in correspondence to the specific contents of the requests. The communication terminal 200 may be constituted with, for instance, a portable telephone.

Figure 2:
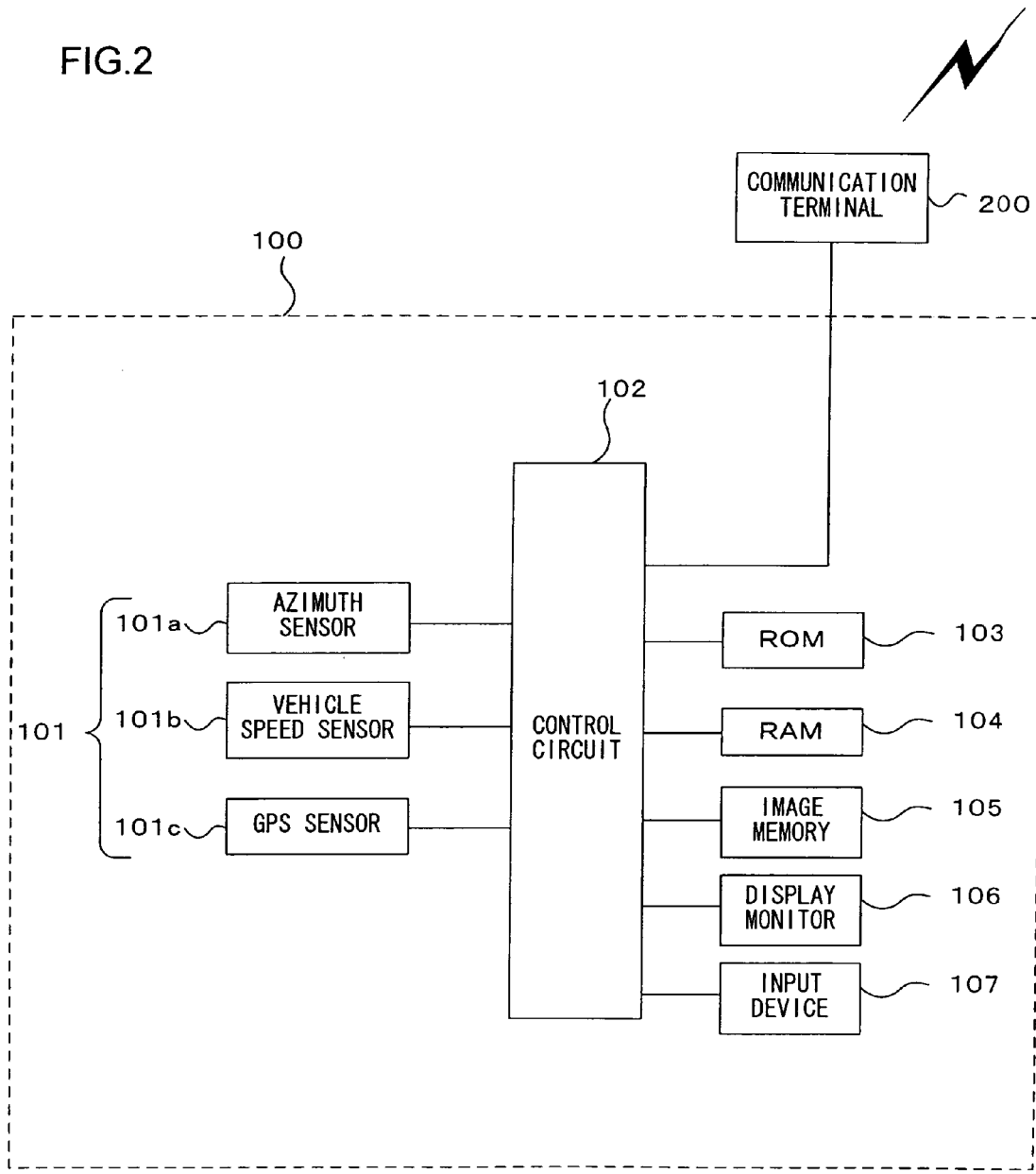
FIG. 2 is a block diagram of the structure of the on-vehicle apparatus used in the map information distribution system in the first through fourth embodiments.

FIG. 2 is a system block diagram of the structure adopted in the on-vehicle apparatus 100 in the map information distribution system in the first embodiment. A current position detection device 101 that detects the current position of the vehicle may be constituted with, for instance, an azimuth sensor 101a that detects the advancing azimuth of the vehicle, a vehicle speed sensor 101b that detects the vehicle speed, a GPS sensor 101c that detects a GPS signal transmitted from a GPS satellite and the like. A control circuit 102 constituted with a microprocessor and its peripheral circuits implements various types of control in a RAM 104 used as a work area by executing a control program stored in a ROM 103.

Image data to be displayed at a display monitor 106 are stored in an image memory 105. The image data are constituted of road map drawing data, various types of graphic data and the like, and map information is displayed at the display monitor 106 based upon map data transmitted from the information distribution center 400 in FIG. 1. An input device 107 includes various switches through which a destination for the vehicle and the like are input. Various types of communication data are exchanged between the communication terminal 200 and the control circuit 102 and the communication terminal 200 is also connected through radio waves with the information distribution center 400 via the mobile communication network 300.

Figure 3:
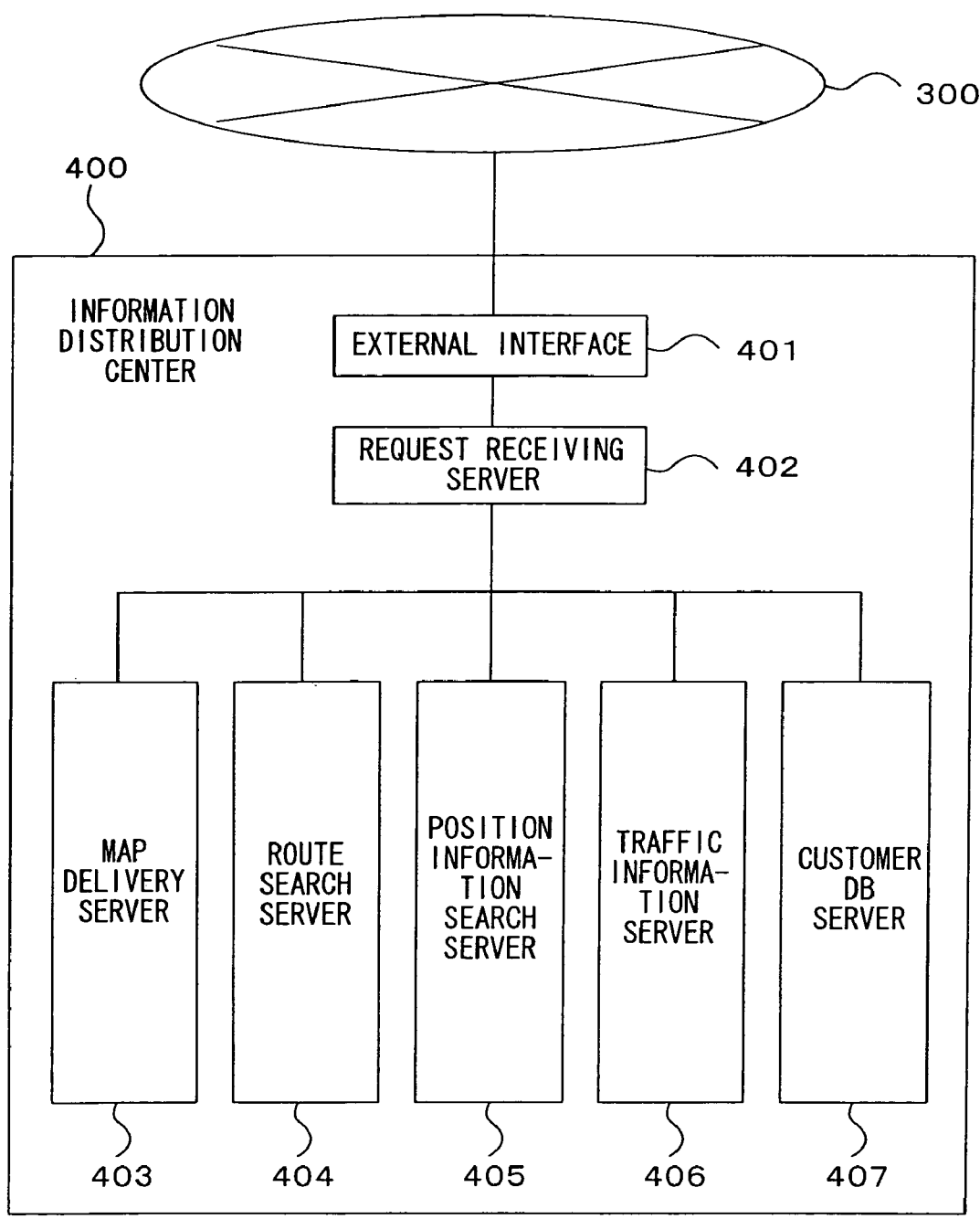
FIG. 3 is a block diagram of the structure of the information distribution center adopted in the map information distribution system in the first through fourth embodiments.

FIG. 3 is a system block diagram of the structure adopted in the information distribution center 400 in the map information distribution system in the first embodiment. The information distribution center 400 is connected with the mobile communication network 300 via an external interface 401. A request receiving server 402 receives a request for a route search and the like via the external interface 401 and then issues a request to a relevant server to be detailed later to execute the requested processing in response to a route search request, a map request or the like. In addition, the results of processing output from the individual servers are output to the external interface 401 as well.

A map distribution server 403 holds map data stored in a storage medium such as a hard disk. In response to a map request from the request receiving server 402, it searches for the requested map data included in the map data stored in memory and outputs the retrieved map data to the request receiving server 402. In response to a route search request from the request receiving server 402, a route search server 404 searches for the requested route by using position information provided by a position information search server 405, a traffic information database provided by a traffic information server 406 and the like and outputs the results of the search. The position information search server 405 conducts a search of facility information and the like corresponding to an area around the current position. The traffic information server 406 holds a database containing current traffic information. A customer DB server 407 holds personal data of the customer to whom the on-vehicle apparatus 100 belongs and updates the personal data based upon the status of utilization of services provided by the information distribution center 400. The personal data include, for instance, billing information.

Figure 4:
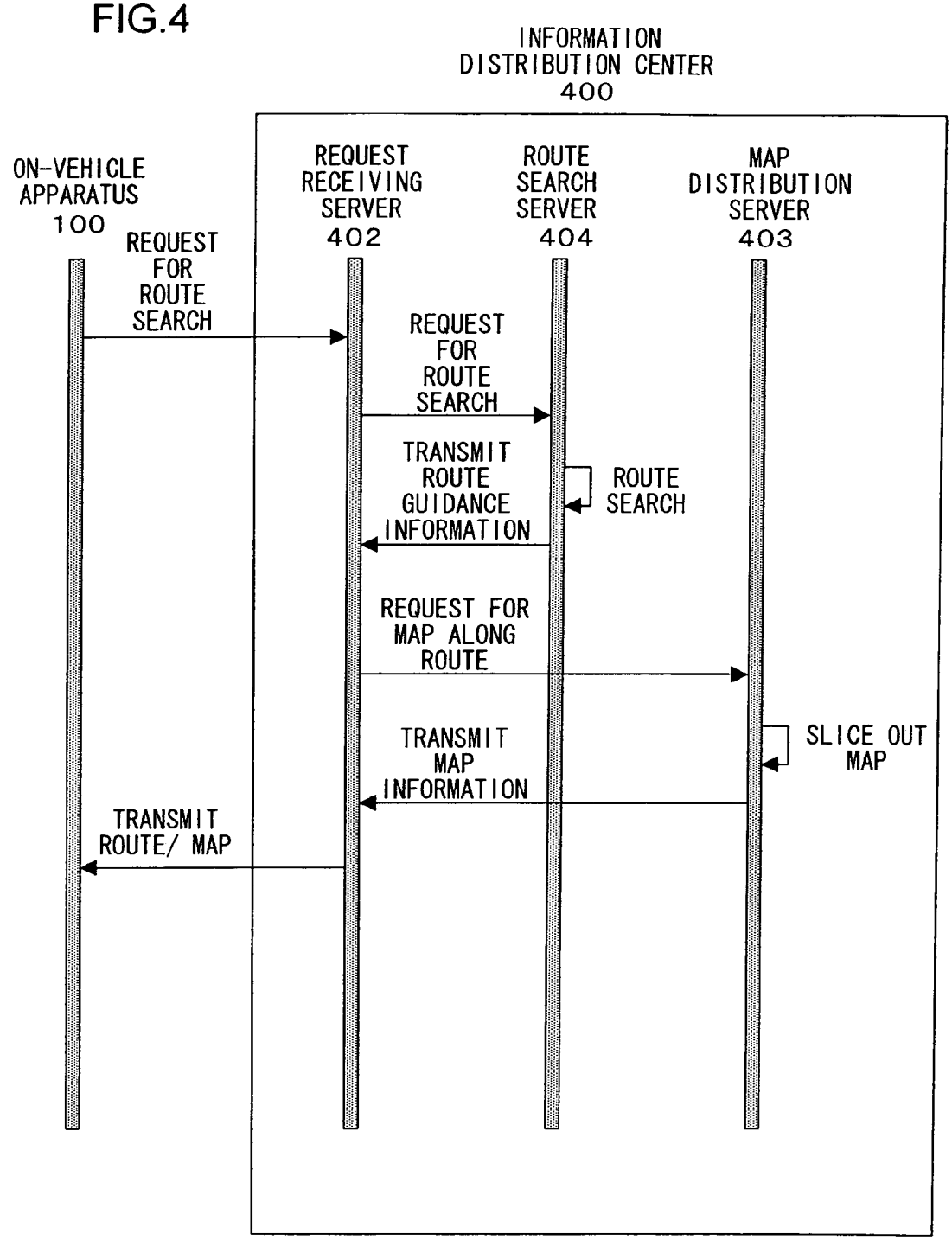
FIG. 4 shows how data flow in response to a route search request.

FIG. 4 shows how data flow in response to a route search request in the map information distribution system in the first embodiment. As a destination is entered through the input device 107, the on-vehicle apparatus 100 issues a route search request. The route search request issued by the on-vehicle apparatus 100 is transmitted to the information distribution center 400 via the communication terminal 200 and the mobile communication network 300. The route search request received at the information distribution center 400 first passes through the external interface 401 and is then input to the request receiving server 402 where the request contents are recognized. At the request receiving server 402, a request for the route search server 404 to conduct a route search is first issued to the route search server 404. The route search server 404, in turn, executes a route search based upon position information provided by the position information search server and traffic information provided by the traffic information server 406, and returns route guidance information to the request receiving server 402. Upon receiving the route guidance information from the route search server 404, the request receiving server 402 outputs a request for a map along the route to the map distribution server 403. The map distribution server 403 extracts map information by slicing out map data over a specific range along the route from the stored map data through the method to be detailed later and transmits the extracted map information to the request receiving server 402.

The request receiving server 402 having obtained the route guidance information and the map information as described above then outputs the obtained information to the external interface 401. The data thus output are transmitted to the on-vehicle apparatus 100 via the mobile communication network 300 and the communication terminal 200. The on-vehicle apparatus 100 provides the transmitted information to the user by displaying it as an image. With this, the sequence of the route search processing ends.

Figure 5:
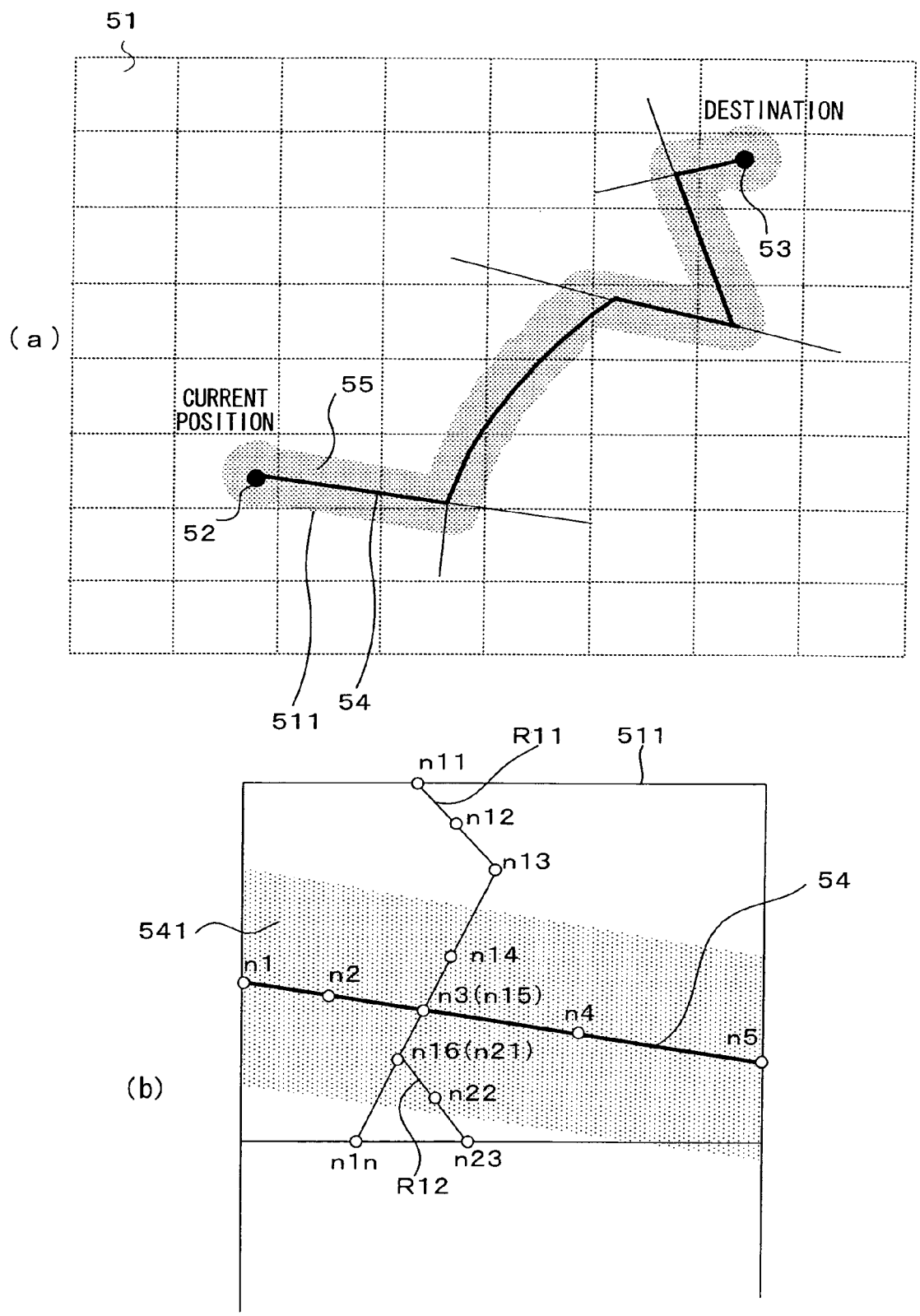
FIG. 5 illustrates a method of slicing out a map within a specific range along the route.

FIG. 5 illustrates the method adopted to slice out the map over the specific range along the route having been set, i.e., over the slicing range set within a predetermined distance from the recommended route. As a destination is set at the on-vehicle apparatus 100, the route search server 404 sets a current position 52 and a destination 53. A recommended route 54 connecting the current position and the destination is set through route search calculation processing in the known art. A slicing range 55 along the route is set over a specific area around the route 54, such as the hatched range in the figure. In addition, the slicing range is set over wider areas around the current position 52 and the destination 53 compared to the slicing range along the route. Map data within the slicing range 55 are extracted in units of individual meshes 51 obtained by dividing the map into equal portions ranging in a specific area size and are distributed to the on-vehicle apparatus 100 as map data from the information distribution center 400.

Figure 6:
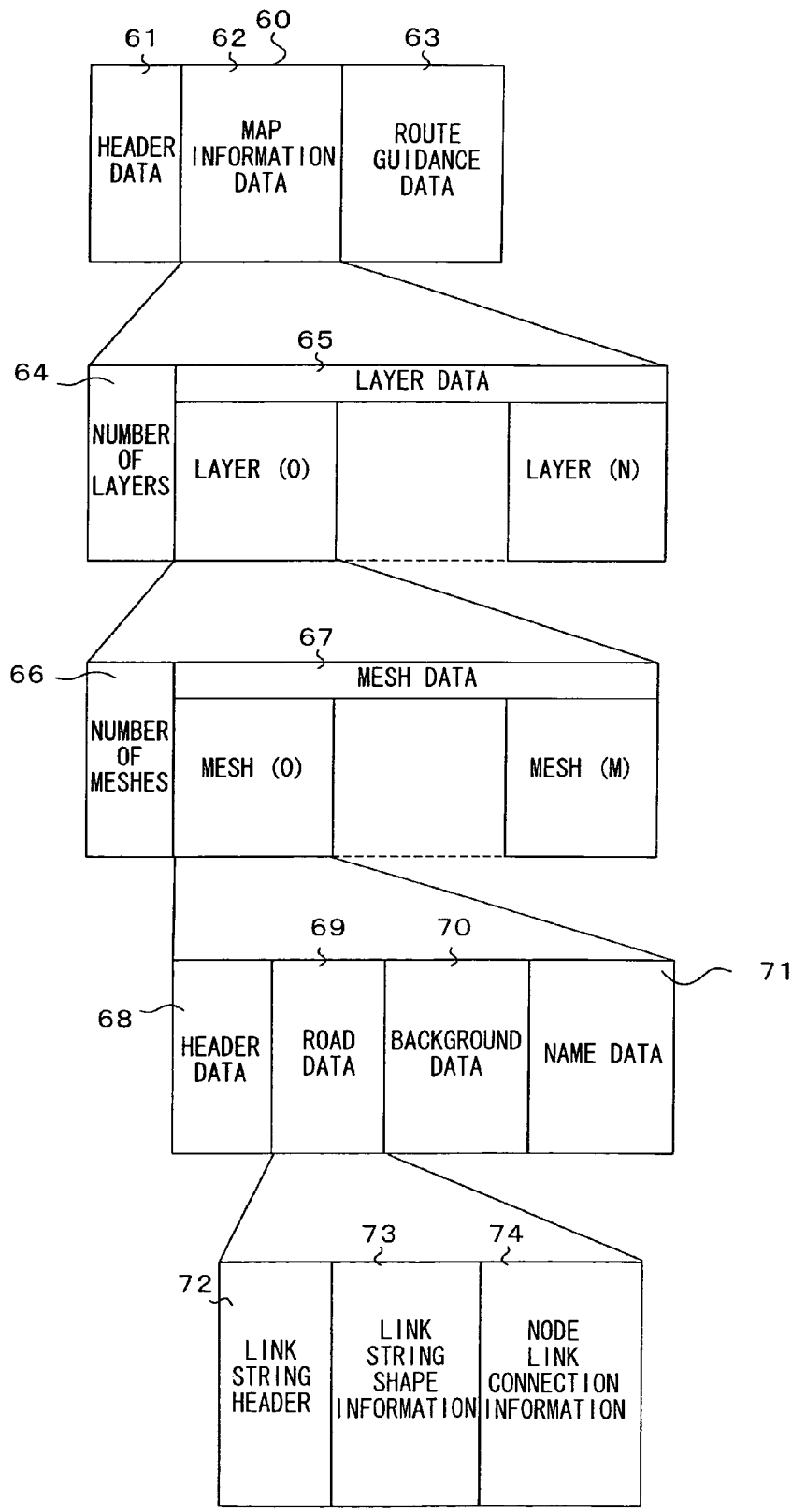
FIG. 6 presents a structural example of map data for transmission.

An example of a structure that may be assumed in the map data transmitted to the on-vehicle apparatus 100 as the search results is presented in FIG. 6. It is to be noted that the data structure, which does not pertain to the element related to the present invention, is not explained in detail below. Map data 60 are constituted with header data 61, map information data 62 and route guidance data 63. The header data 61 include various types of management data. The route guidance data 63 are constituted with name data and shape data with regard to guidance points set on the route determined through the search, i.e., data indicating the names and the shapes of, for instance, intersections and buildings, right/left turn data and the like. The map information data 62 are constituted with a number of layers 64 and layer data 65. The layer data 65 are constituted of the data contained in layers (0) to (N). The layer (0) to the layer (N) are defined as maps assuming scaling factors different from one another. The number of layers 64 indicates the number of layers (N+1 layers in this example).

In the layer data 65, for instance, the data of the layer (0) are constituted with a number of meshes 66 and mesh data 67. The data of other layers are constituted with similar structure to this. The mesh data 67 are constituted of data contained in mesh (0) to mesh (M). The mesh (0) to the mesh (M) are defined as areas obtained by dividing the map at the scaling factor defining the layer (0) into equal portions corresponding to a specific range. The number of meshes 66 indicates the number of meshes (M+1 meshes in this example).

In the mesh data 67, for instance, the data of the mesh (0) are constituted with header data 68, road data 69, background data 70 and name data 71. The data of the other meshes adopt similar structure to this. The header data 68 contain various types of management data. The background data 70 are constituted of data related to the background other than roads that is displayed on the map, e.g., data related to railways, rivers and lakes. The name data 71 are constituted of data indicating the names of the roads and the background objects in the road data 69 and the background data 70.

The road data 69 are constituted with a link string header 72, link string shape information 73 and node link connection information 74. The link string header 72 contains various types of management data including a flag which indicates the presence/absence of node link connection information (to be detailed later). The link string shape information 73 includes data with regard to the shape of the road formed by a given link string, such as the coordinates of the individual nodes in the link string. The node link connection information 74 includes data related to road connections, i.e., data indicating how the individual nodes in link strings are connected. In the map information distribution system achieved in the first embodiment, the volume of transmission data is reduced by limiting the volume of the node link connection information to be transmitted as part of the map data.

It is to be noted that map data of the entire nation assuming the data structure shown in FIG. 6 are stored in the map distribution server 403. In other words, in response to a route search request, a map along the recommended route extending from the current position to the destination is sliced out from the map database holding the map data of the entire nation and the map data for distribution assuming the structure shown in FIG. 6 are prepared. It is assumed that the unsliced nationwide map data contain information indicating the presence of any elevated installation overhead which is to be detailed later and information indicating the numbers of intersections.

Figure 7:
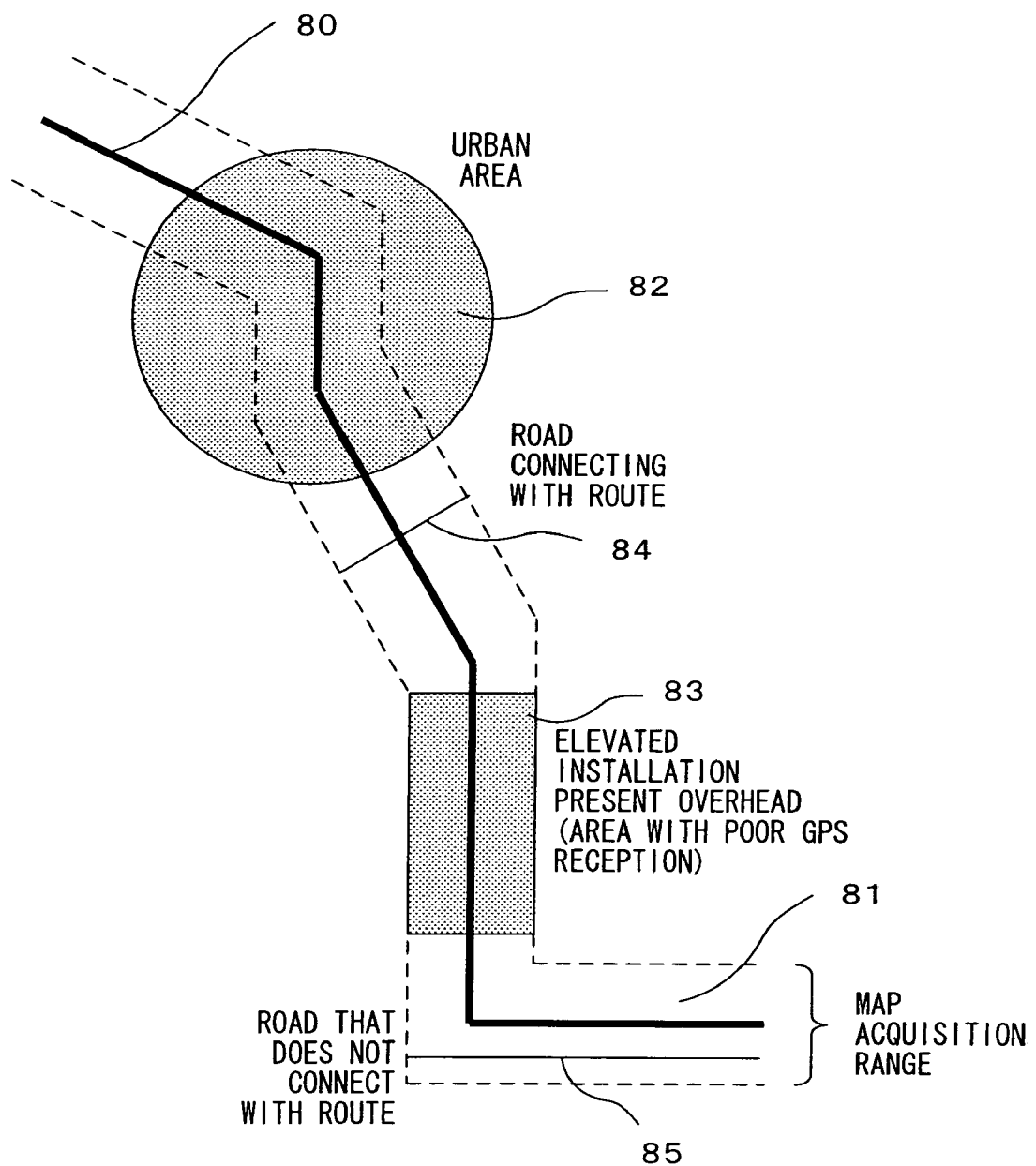
FIG. 7 shows conditions set for node link connection information elimination.

FIG. 7 shows portions of the map sliced out along the route, in which data are reduced, in the map information distribution achieved in the first embodiment. The volume of transmission data is reduced by limiting the volume of node link connection information 74 for transmission as explained below over a map acquisition range 81 sliced out through the method described earlier along a route 80 set by the route search server 404.

The node link connection information is included in the transmission data over a range 82 set in an urban area where numerous roads run and information related to the connections of the various roads should be provided. In addition, the node link connection information is included in the transmission data corresponding to an area designated as an area with poor GPS reception, e.g., a range 83 with an elevated installation present overhead, since it is difficult to pinpoint the position of the vehicle and thus it is necessary to execute map matching with a high degree of accuracy in an area with poor GPS reception. Areas with good GPS reception include roads in the suburbs. As positional detection can be executed with a high degree of accuracy by using GPS signals on such roads, map matching may be skipped. The node link connection information of any road connecting with the route 80 such as a road 84 is included in the transmission data as well.

The node link connection information of any road that is not contained in the range explained above, e.g., a road 85, is not included in the transmission data, since the node link connection information indicating the connection of the road 85 is not needed to guide the vehicle along the route 80.

Figure 8:
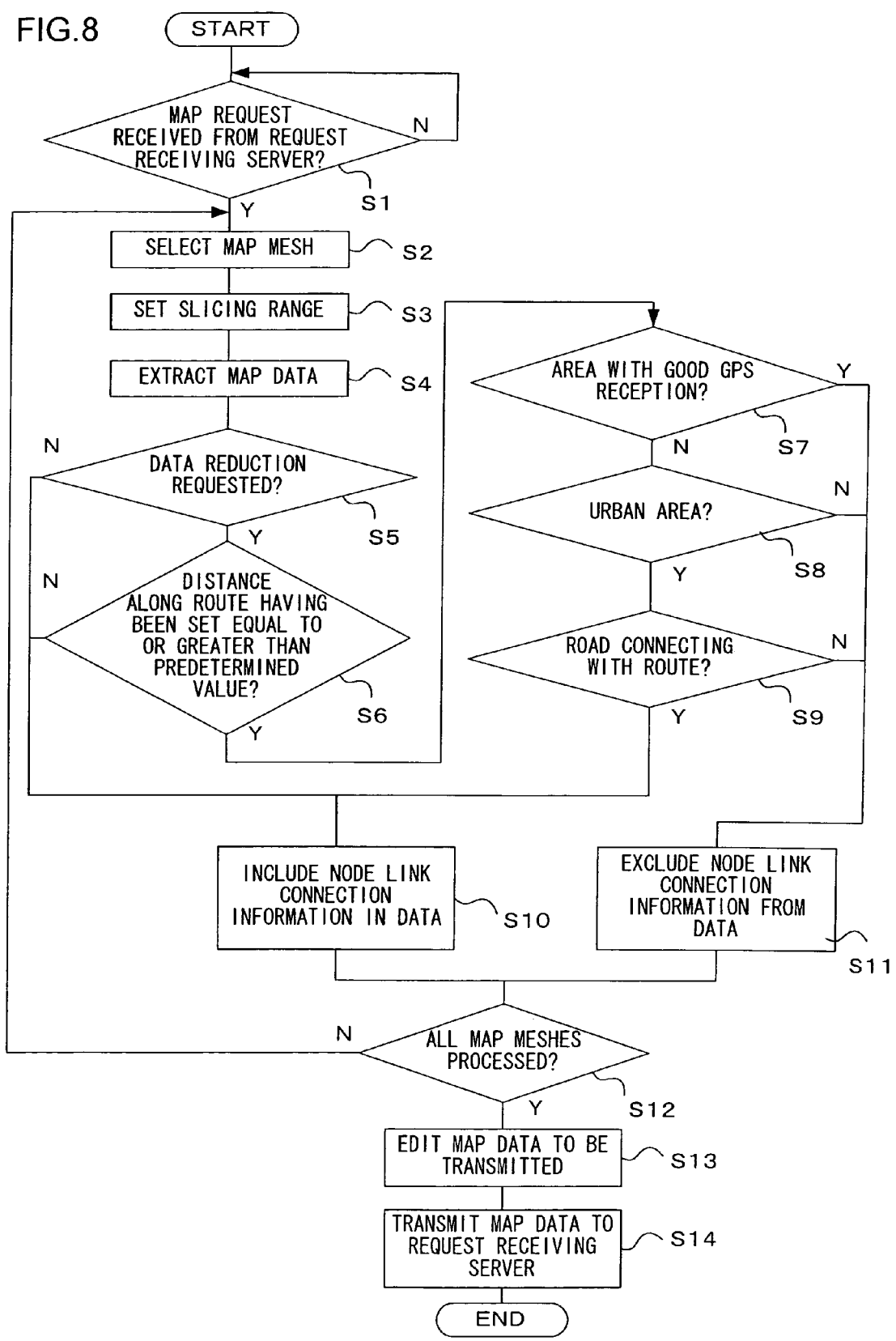
FIG. 8 presents a flowchart of the processing executed in the map information distribution system in the first embodiment to eliminate node link connection information.

FIG. 8 presents a flowchart of the control implemented on the processing executed in the map information distribution system in the first embodiment to reduce the volume of node link connection information. This control flow is executed constantly based upon a program executed by the map distribution server 403. In step S1, a decision is made as to whether or not a map request has been received from the request receiving server 402. The operation proceeds to the following step S2 if a map request has been received, whereas the processing in step S1 is repeatedly executed if no map request has been received.

In step S2, a map mesh is selected. The term "map mesh" in this context refers to a group of map data in a specific partitioned area set over a specific range (a specific partitioned area) in a given map layer. The term "map layers" refers to a hierarchical structure of map data with the individual map layers defined in correspondence to scaling factors different from one another. In step S3, a slicing range in the selected mesh is set. In step S4, the map data within the slicing range are extracted. The processing in steps S2 to S4 is now explained in detail.

In step S2, all the meshes through which the recommended route extending from the current position to the destination passes are extracted and one of the extracted meshes is selected. If the processing in step S2 is being executed for the first time in the control flow shown in FIG. 8, the mesh in which the current position is located is selected as the first mesh. Next, a mesh containing the recommended route or a mesh near the recommended route, which is adjacent to the mesh containing the current position, is selected as a second mesh, and a mesh adjacent to the second mesh, through which the recommended route passes, is selected as a third mesh. Finally, a mesh in which the destination is located is selected as an nth mesh.

In step S3, the slicing range over which the map data are to be extracted is set for the selected mesh. When the first mesh containing the current position is selected, an area surrounding the current position over, for instance, a radius of 250 meters around the current position is identified and set as the slicing range. If this current position surrounding area ranges into an adjacent mesh, the current position surrounding area contained in the adjacent mesh, too, is set as part of the current position surrounding area over which the map data are to be sliced out.

In addition, the portion of the recommended route running outside the current position surrounding area but inside the mesh containing the current position is identified. Then, an area along this portion of the recommended route, e.g., an area ranging on both sides of the recommended route over a width of 500 m, is identified and set as the slicing range. This slicing range along the recommended route is not set if the recommended route does not run outside the current position surrounding area in the mesh.

If a second mesh adjacent to the mesh containing the current position, through which the recommended route passes, is selected in step S2, an area along the route passing through the second mesh, e.g., an area ranging on both sides of the route over a width of 500 meters, is identified and is set as the slicing range.

When the nth mesh containing the destination is selected in step S2, an area surrounding the destination over, for instance, a radius of 250 meters around the destination is identified and set as the slicing range in step S3. If this destination surrounding area ranges into an adjacent mesh, the destination surrounding area contained in the adjacent mesh, too, is set as part of the destination surrounding area over which the map data are to be sliced out. In addition, the portion of the recommended route running outside the destination surrounding area but inside the mesh containing the destination is identified. Then, an area along the recommended route, e.g., an area ranging on both sides of the recommended route over a width of 500 m, is identified and is set as the slicing range. This slicing range along the recommended route is not set if the recommended route does not run outside the destination surrounding area in the mesh.

In step S4, the map data in the slicing range set in step S3 are extracted. The road data are constituted as link string data, each set thereof having a plurality of nodes connecting a start point node to an end point node. The nodes each have specific coordinate values. Accordingly, map data containing node information corresponding to all the nodes with coordinate values within the area set as the slicing range are extracted.

This data extraction processing is executed in the meshes starting with the mesh containing the current position and ending with the mesh containing the destination so as to extract all the map data within the route surrounding area over the specific range set along the route extending from the current position to the destination.

FIG. 5(*b*) is an enlargement of the mesh 511 in FIG. 5(*a*). A link string R11 having nodes n11 to n17 and a link string R12 having nodes n21 to n23 are present within a route surrounding area 541 with, for instance, a width of 500 m along the route 54 in the mesh 511. Among the nodes in the link strings R11 and R12, the nodes n14, n15, n16, n21 and n22 contained in the route surrounding area 541 are extracted. Since the nodes n11 to n13, n17 and n23 are present outside the slicing range, no map data are extracted in correspondence to these nodes. It is to be noted that map data containing node information of all the nodes present in an adjacent mesh, into which the route surrounding area ranges but through which the recommended route 54 does not pass, are also extracted.

In step S5, a decision is made as to whether or not a data reduction request has been issued for the selected map mesh. This decision may be made based upon a flag setting indicated in the data transmitted from the on-vehicle apparatus 100, for instance. It is to be noted that a data reduction request may be issued by, for instance, selecting a specific mode setting through an operation of the input device 107. The operation proceeds to the following step S6 if a data reduction request has been issued, whereas the operation proceeds to step S10 upon deciding that the data volume is not to be reduced if there is no such request. In step S6, a decision is made as to whether or not the entire distance over which the recommended route having been set extends is equal to or greater than a predetermined value. A value representing a distance at which an excessively large volume of map data will need to be sliced out over the range set along the route and thus the need to reduce the data volume will arise is selected for this predetermined value. The operation proceeds to the following step S7 if the distance is judged to be equal to or greater than the predetermined value, whereas the operation proceeds to step S10 upon deciding that the data volume is not to be reduced if the distance is judged to be less than the predetermined value. It is to be noted that the processing in step S6 may be skipped. Namely, the processing in steps S7, S8 and S9 may be simply executed without first executing step S6 to reduce or not reduce the data volume based upon the various criteria in steps S7, S8 and S9, regardless of the specific volume of the extracted map data corresponding to the entire recommended route.

In step S7, a decision is made as to whether or not the currently selected map mesh is designated as an area with good GPS reception. When making the GPS reception condition designation, an area with an elevated installation present overhead, for instance, is designated as an area with poor GPS reception. If the map mesh is designated as an area with good GPS reception, the operation proceeds to step S11 upon deciding that the data are to be reduced. If, on the other hand, the map mesh is designated as an area with poor GPS reception, the operation proceeds to the following step S8.

In step S8, a decision is made as to whether or not the currently selected map mesh is designated as an urban area. When making this urban area designation, an area containing a predetermined minimum number of intersections, for instance, is designated as an urban area. The operation proceeds to step S11 upon judging that the data are to be reduced if the map mesh is not designated as an urban area. However, if the map mesh is designated as an urban area, the operation proceeds to the following step S9.

In step S9, a decision is made as to whether or not each of the roads contained in the selected map mesh connects to the route. The operation proceeds to step S11 upon deciding that the data are to be reduced if a given road does not connect with the route. The operation proceeds to step S10 upon deciding that the data are not to be reduced if the road is judged to connect with the route.

In step S10, to which the operation proceeds after deciding that the data are not to be reduced, the node link connection information is included in the transmission data. In step S11, to which the operation proceeds after deciding that the data are to be reduced, on the other hand, the node link connection information is excluded from the transmission data.

In step S12, a decision is made as to whether or not the processing executed in steps S2 through S11 has been completed for all the map meshes pertaining to the route with regard to which the map request was received. If it is decided that the processing has been completed for all the map meshes, the operation proceeds to step S13, whereas the operation returns to step S2 to execute the processing again if the processing for all the map meshes has not been completed. In step S13, the individual sets of map data, some containing the node link connection information and the others without the node link connection information as determined through the processing executed in step S12, are compiled and are edited in a specific data format shown in FIG. 6 as transmission data. At this time, each set of the data without the node link connection information is appended with a flag indicating the absence of the node link connection information. In step S14, the map data edited in step S13 are transmitted to the request receiving server. The volume of transmission data is reduced through the method described above.

It is to be noted that if the vehicle leaves the recommended route, the on-vehicle apparatus 100 re-executes an arithmetic operation for the route search by using the node link connection information that it has received and stored into memory. Under such circumstances, the route search arithmetic operation cannot be re-executed in an area meeting a specific data reduction criterion, as described earlier, over which no node link connection information is available. Accordingly, the on-vehicle apparatus 100 transmits a repeated route search request to the information distribution center 400. In addition, even in an area with the node link connection information, the on-vehicle apparatus 100 may not be able to re-execute the route search arithmetic operation due to an insufficient data volume. In this case, too, a repeated route search request is transmitted to the information distribution center 400.

The following advantages are achieved by adopting the map information distribution system in the first embodiment described above.

(1) In a non-urban area or an area with good GPS reception, the number of roads connecting with the recommended route will be smaller and there is not much need to display them, and for this reason, the node link connection information over the area is eliminated. As a result, the volume of map data around the recommended route to be distributed from the information distribution center to the on-vehicle apparatus can be reduced to result in reductions in both the length of communication time and the communication cost.

(2) Information indicating that the data volume has been reduced is appended to enable the on-vehicle apparatus to recognize any absence of the node link connection information.

Second Embodiment

The map information distribution system achieved in the second embodiment of the present invention is now explained. While the data volume is reduced in the first embodiment by eliminating the node link connection information from the transmission data as necessary, the data volume is reduced in the second embodiment by culling as necessary the link string shape information, which indicates road shapes. Since the system configuration and the method adopted to slice out the map data within a specific range along the route are identical to those in the first embodiment, their explanation is omitted.

Figure 9:
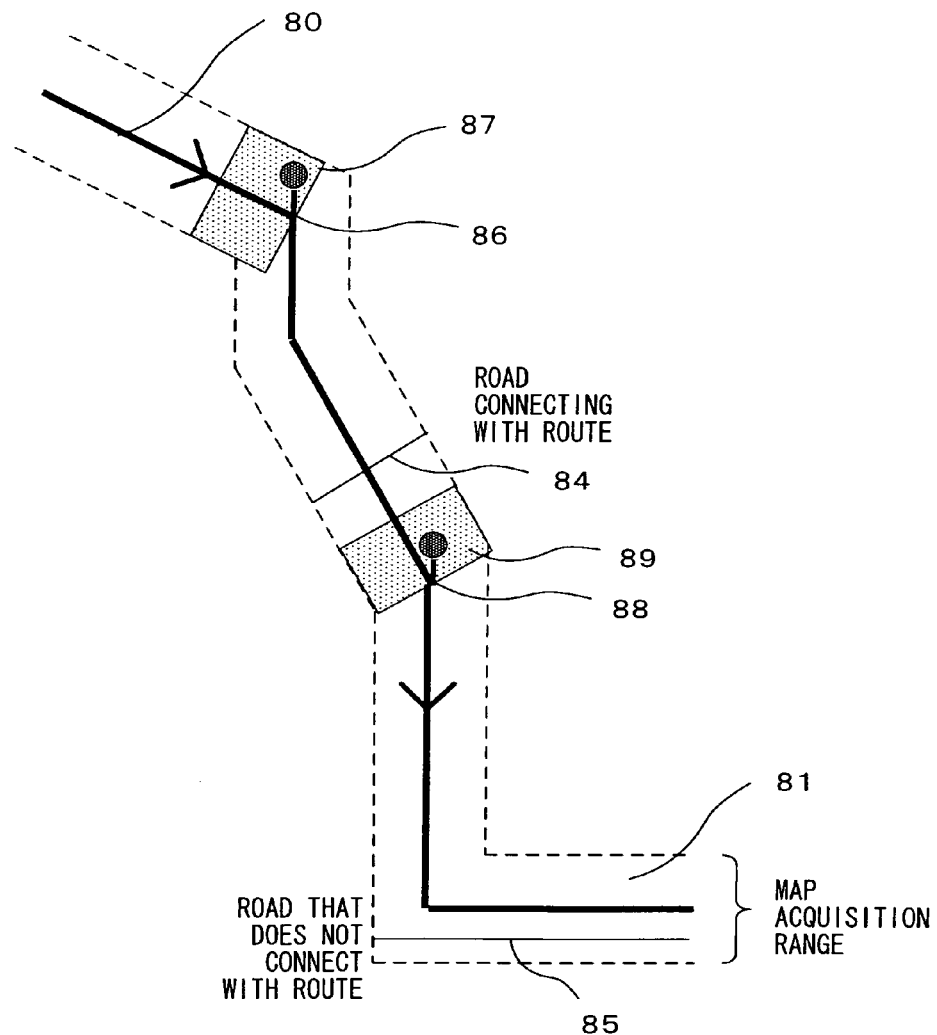
FIG. 9 illustrates conditions under which road shape data are culled.

FIG. 9 shows areas in which the data are reduced in the map sliced out along the route in the map information distribution system achieved in the second embodiment. The link string shape information 73 within the map acquisition range 81 over which the map is sliced out along the route 80 set by the route search server 404 through the method described earlier is reduced as explained below to reduce the entire transmission data volume.

Link string shape information in ranges 87 and 89 preceding guidance points 86 and 88 respectively (assuming that the vehicle advances from the upper left side toward the lower right side in the figure) over a predetermined distance is retained intact, since the road shapes need to be displayed accurately in order to provide guidance for the vehicle near the guidance points. The term "guidance point" in this context refers to a point at which the advancing direction along the route changes, e.g., a point at which the vehicle makes a turn at an intersection. Some of the link string shape information in the rest of the map acquisition range, corresponding to the recommended route and other roads such as the road 85, is eliminated from the transmission data, since it is not necessary to indicate the exact road shapes by using all the link string shape information when guiding the vehicle straight ahead along the route.

Figure 10:
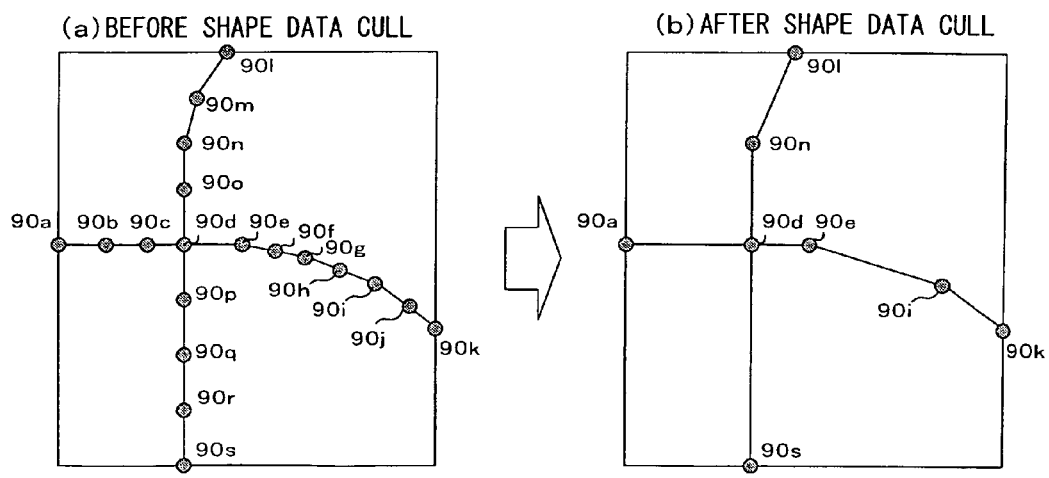
FIG. 10 shows how the appearance of the map changes after the shape data cull processing.

FIG. 10 shows how the road shapes displayed at the on-vehicle apparatus change as part of the link string shape information is eliminated from the transmission data through the method described above. The road shapes are indicated by using the entire link string shape information as lines connecting individual nodes 90$a$ to 90$s$ at specific coordinate positions, as shown in FIG. 10($a$). After part of the link string shape information is eliminated, the map data no longer contain the link string shape information corresponding to nodes other than the nodes 90$a$, 90$d$, 90$e$, 90$i$, 90$k$, 90$l$, 90$n$ and 90$s$, as shown in FIG. 10($b$) (the map data have been culled). After the data cull, the roads are indicated as lines connecting the remaining nodes. The decision as to the data of which nodes should be culled is made in conformance to a specific algorithm by, for instance, calculating the extent to which the road shape will change after culling the data corresponding to each node and deciding that the data of the node are to be culled if the extent of the change is equal to or less than a predetermined value, e.g., if the node is on a straight road or on a road with a large radius of curvature.

Figure 11:
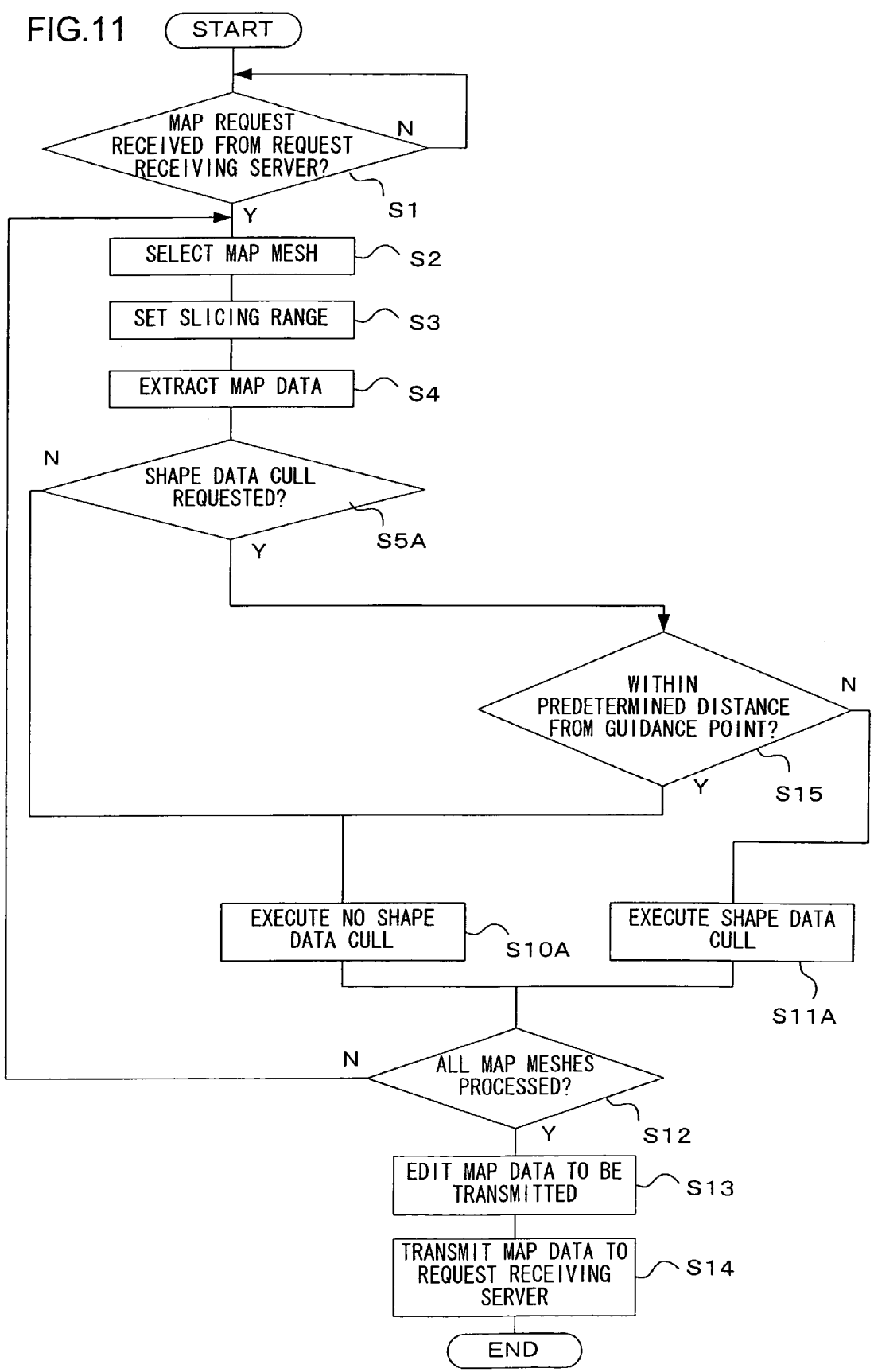
FIG. 11 presents a flowchart of the processing executed in the map information distribution system in the second embodiment to cull road shape data.

FIG. 11 presents a flowchart of the control implemented during the processing executed in the map information distribution system in the second embodiment to eliminate part of the link string shape information. The flow of this control is implemented at all times on the processing executed by the map distribution server 403 in conformance to a program. In steps S1 to S4, processing similar to that executed in the map information distribution system in the first embodiment to reduce the node link connection information is executed.

In step S5A, a decision is made as to whether or not a shape data cull request has been issued for the selected map mesh. This decision may be made by, for instance, checking a flag contained in data transmitted from the on-vehicle apparatus 100. As is the case with the data reduction request, the user is allowed to set a shape data cull request mode through the input device 107. The operation proceeds to the following step S15 if it is decided that a shape data cull request has been issued, whereas the operation proceeds to step S10A upon deciding that the data are not to be reduced if a shape data cull request has not been issued.

In step S15, a decision is made as to whether or not each set of link string data extracted from the selected map mesh is contained in the predetermined range preceding a guidance point. If the link string data are not contained in the predetermined range preceding a guidance point, the operation proceeds to step S11A upon deciding that the data are to be reduced through the shape data cull. If, on the other hand, the link string data are contained in the predetermined range preceding a guidance point, the operation proceeds to the following step S10A.

In step S10A, to which the operation proceeds after deciding that the data are not to be reduced through the shape data cull, all the link string shape information is included into the transmission data. In step S11A, to which the operation proceeds after deciding that the data are to be reduced through the shape data cull, on the other hand, the shape data cull is executed by partially eliminating the link string shape information.

In steps S12 through S14, processing similar to the processing executed in the map information distribution system in the first embodiment to reduce the node link connection information is executed. As in the processing executed in the map information distribution system in the first embodiment to reduce the node link connection information, a flag indicating that the shape data cull has been executed is attached to each set of data having undergone the shape data cull (data with the link string shape information partially eliminated). The volume of the transmission data is reduced through this method.

The following advantages are achieved by adopting the map information distribution system in the second embodiment described above.

(1) A rough representation of the shape of a road shape is deemed to suffice even on the recommended route since the vehicle will only need to travel straight ahead along the road as long as the road is outside a predetermined range preceding a guidance point, and accordingly, the volume of the data indicating the road shape outside the predetermined range is reduced through the shape data cull. In addition, the shape data related to a road connecting with the recommended route, which does not bear direct relation to a guidance point, too, are reduced through the shape data cull. As a result, the volume of map data around the recommended route to be distributed from the information distribution center to the on-vehicle apparatus is reduced to achieve reductions in both the length of communication time and the communication cost.

(2) Information indicating that the data volume has been reduced is attached. Thus, the on-vehicle apparatus is enabled to recognize data having undergone the shape data cull.

Third Embodiment

The map information distribution system achieved in the third embodiment of the present invention is explained. As in the second embodiment, part of the link string shape information related to any road that is not connected to the recommended route is eliminated to reduce the data volume in the map information distribution system in the third embodiment. To explain the method adopted in the third embodiment in reference to FIG. 9, the link string shape information corresponding to a road connected with the route 80, e.g., the road 84, is left intact. Part of the link string shape information of a road not connected with the route 80, e.g., the road 85, is eliminated from the transmission data.

Figure 12:
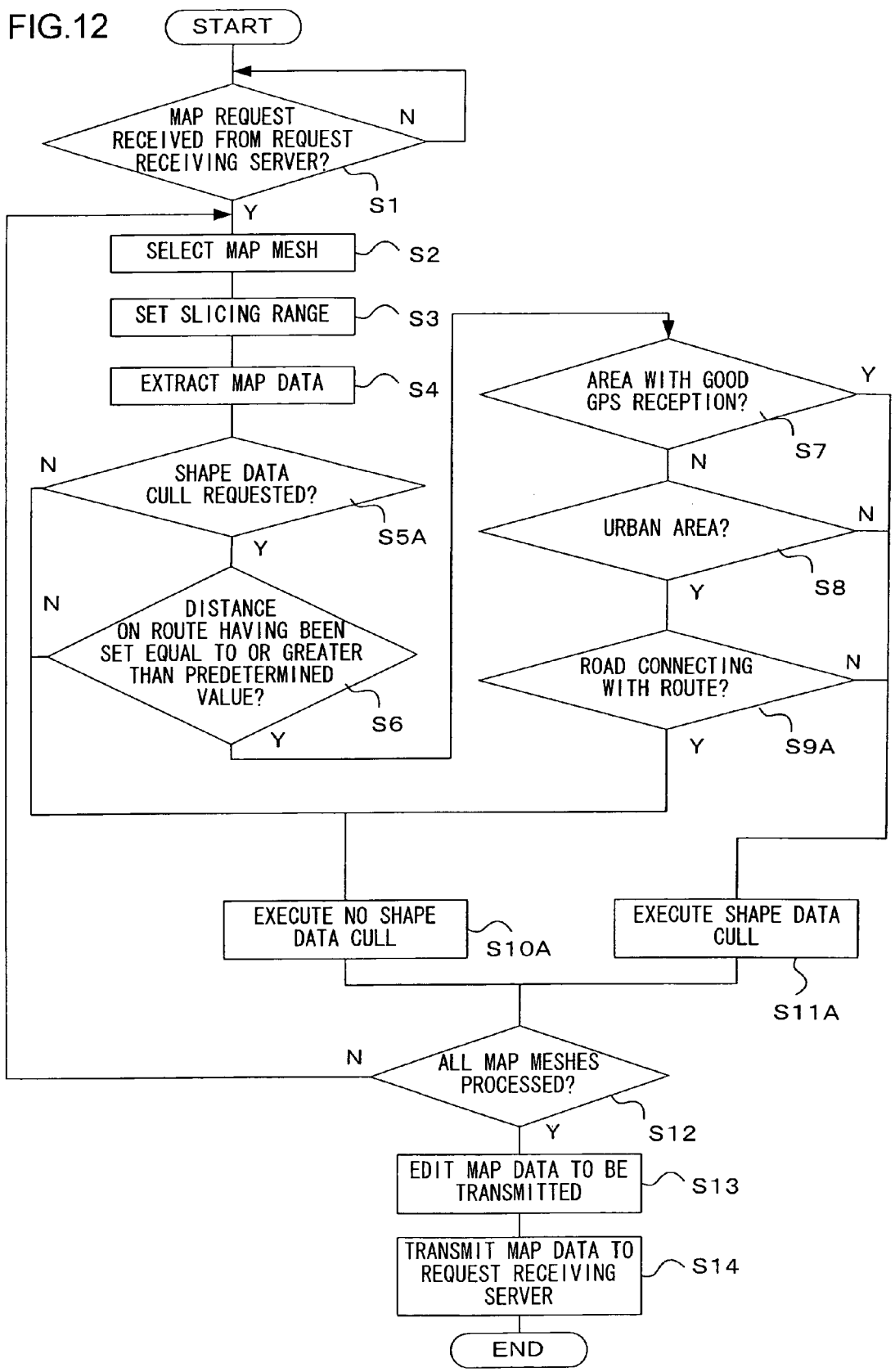
FIG. 12 presents a flowchart of the processing executed in the map information distribution system in the third embodiment to cull road shape data.

FIG. 12 presents a flowchart of the control implemented on the processing executed in the map information distribution system in the third embodiment to eliminate part of the link string shape information. This control flow is constantly implemented on the processing executed by the map distribution server 403 in conformance to a program. It is to be noted that since the third embodiment is identical to the second embodiment except for its control flow, the following explanation focuses on the control flow. In steps S1 through S5A, processing similar to the processing flow in the map information distribution system in the second embodiment executed to eliminate part of the link string shape information is executed. In steps S6 through S8, processing similar to that executed in the map information distribution system in the first embodiment to reduce the volume of the node link connection information is executed.

In step S9A, a decision is made as to whether or not each road present in the selected map mesh connects with the route. The operation proceeds to step S11A upon deciding that the data are to be reduced if the road does not connect with the route. The operation proceeds to step S10A upon deciding that the data are not to be reduced if the road is judged to connect with the route. In steps S10A through S14, processing similar to the processing executed in the map information distribution system in the second embodiment to eliminate part of the link string shape information is executed. The volume of the transmission data is thus reduced.

The following advantage is achieved by adopting the map information distribution system in the third embodiment described above.

(1) A road contained in the slicing range set along the recommended route, which does not connect with the recommended route, e.g., a road extending parallel to the recommended route, is deemed to bear little significance on the display brought up when providing the road guidance, and accordingly, the volume of data related to such a road is reduced through a shape data cull. As a result, the volume of map data around the recommended route to be distributed from the information distribution center to the on-vehicle apparatus is reduced to achieve reductions in both the length of communication time and the communication cost.

Fourth Embodiment

The map information distribution system achieved in the fourth embodiment of the present invention is now explained. In the fourth embodiment, if a POI (point of interest; information on a sightseeing spot or a specific type of facility) satisfying a specific requirement is present slightly beyond the map slicing range set along the route, the range in the vicinity of the POI is expanded to modify the map slicing range. Since a system configuration identical to that in the first through third embodiments is adopted in the fourth embodiment, its explanation is omitted.

Figure 13:
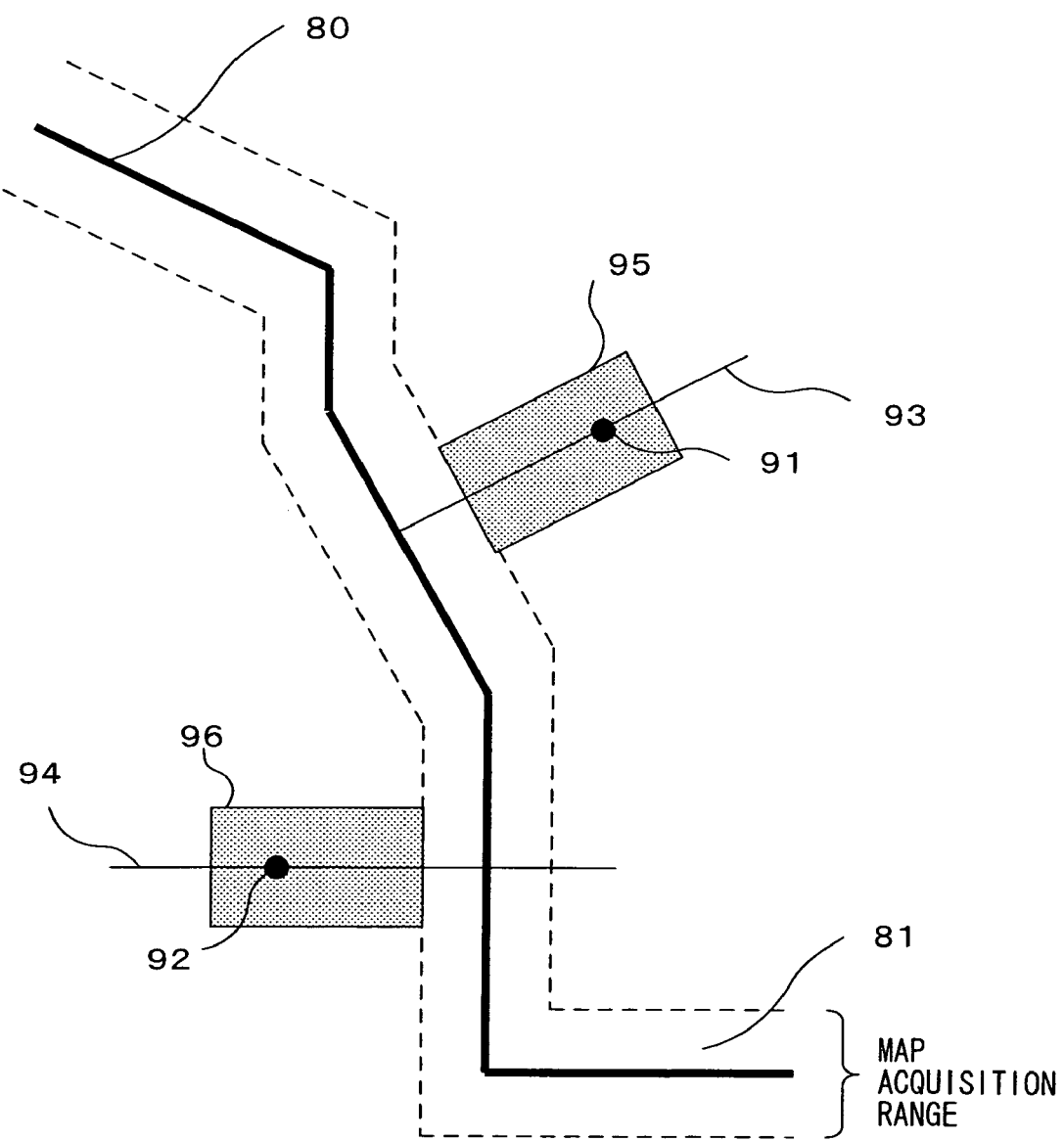
FIG. 13 illustrates conditions under which the slicing range is reset.

FIG. 13 illustrates the method adopted in the map information distribution system in the fourth embodiment to modify the map slicing range in the vicinity of POIs. Map data within the map acquisition range 81 along the route 80 set by the route search server 404 are first sliced out through a method similar to that explained earlier in reference to the map information distribution system in the first embodiment. Now, let us assume that a POI 91 and a POI 92 each satisfying a specific requirement are present within a predetermined distance beyond the map acquisition range 81 and that roads 93 and 94 connecting with the route 80 allow access from the route 80 to the POI 91 and the POI 92 and from the POI 91 and the POI 92 to the route 80. In this situation, map acquisition ranges 95 and 96 are respectively set around the POI 91 and the road 93 connecting with the POI 91 and around the POI 92 and the road 94 connecting with the POI 92. Then, map data to be transmitted are extracted over a map acquisition range that includes the map acquisition ranges 95 and 96 as well as the map acquisition range 81.

The POI requirements mentioned above may include the following:

(1) A specific type of facility which is of interest to the user, pre-selected by the user at the on-vehicle apparatus 100;
(2) a specific type of facility that the user is likely to wish to use around the estimated time point at which the vehicle on the route is expected to arrive at the facility location, e.g., a restaurant during mealtimes; and
(3) a refueling facility such as a gas station selected by estimating a traveling distance, a time point, a geographical position or the like at which the remaining fuel quantity is expected to become equal to or less than a predetermined value.

Figure 14:
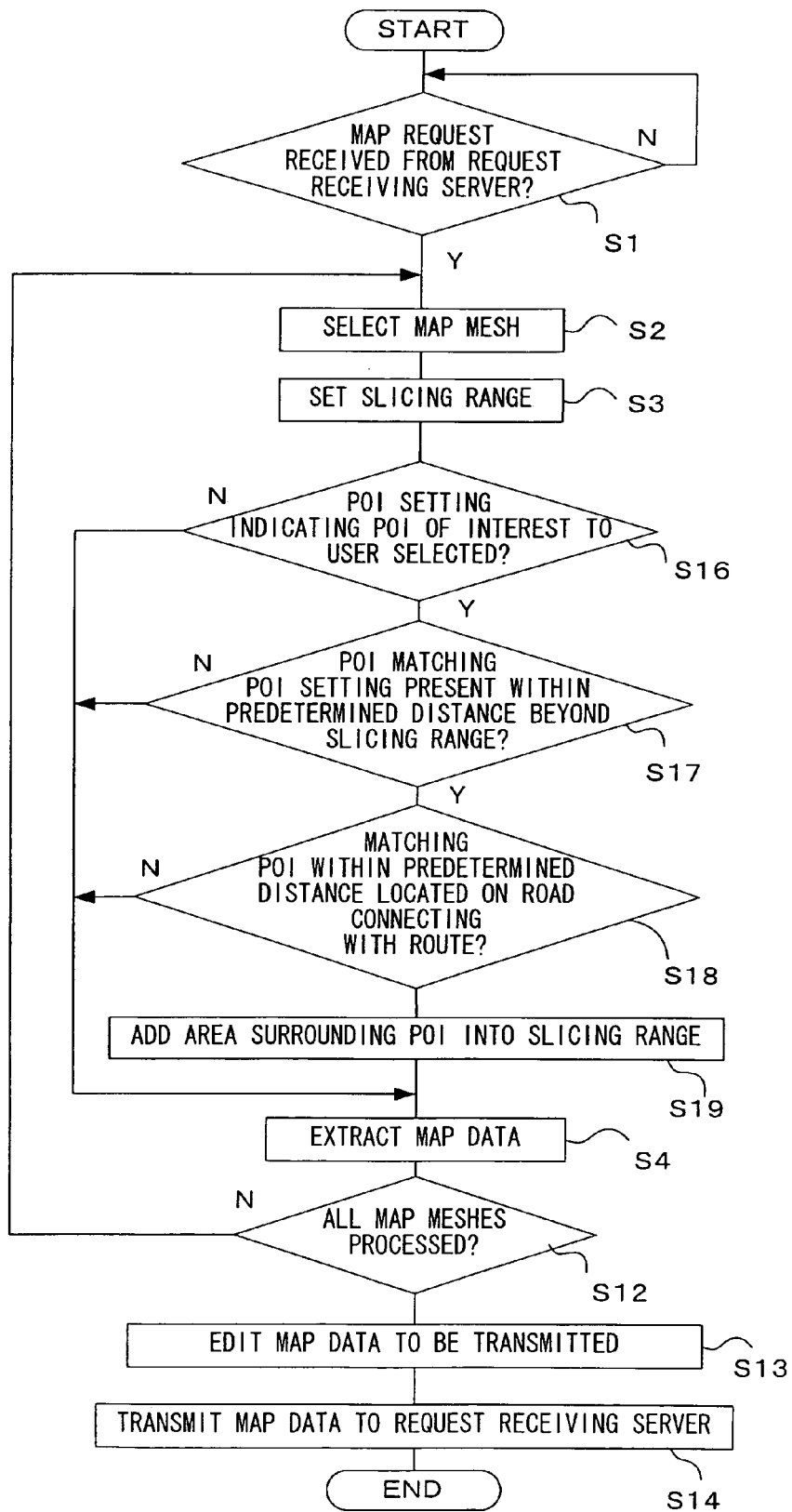
FIG. 14 presents a flowchart of the processing executed in the map information distribution system in the fourth embodiments to reset the slicing range.

FIG. 14 presents a flowchart of the control implemented on the processing executed in the map information distribution system in the fourth embodiment to modify the map slicing range in the vicinity of a POI. This control flow is continuously implemented on the processing executed by the map distribution server 403 in conformance to a program. In steps S1 through S3, processing similar to that in the control flows implemented in the map information distribution systems in the first through third embodiments is executed.

In step S16, a decision is made as to whether or not any POI setting indicating that a specific type of POI of particular interest to the user has been selected. This decision-making may be enabled by, for instance, transmitting any POI setting selected through an operation of the input device 107 at the on-vehicle apparatus to the information distribution center 400 together with the route search request. Alternatively, a decision may be made by checking any POI automatically set at the information distribution center 400 as explained in (2) and (3) above, as per the state of the user utilizing the system. The operation proceeds to step S17 if it is decided that any POI setting is selected, whereas the operation proceeds to step S4 if no POI setting is selected.

In step S17, a decision is made as to whether or not the type of POI determined to be set in step S16 is present within a predetermined distance beyond the slicing range set in step S3. The predetermined distance used to make this decision will have been selected when, for instance, selecting a specific POI setting at the on-vehicle apparatus 100 which has been verified in step S16 as described above. If the specific type of POI is present within the predetermined distance, the operation proceeds to step S18, whereas the operation proceeds to step S4 if no such POI is present within the predetermined distance.

In step S18, a decision is made as to whether or not the POI determined to be present within the predetermined distance in step S17 is located along a road connecting with the route. If the POI is determined to be located on a road connecting with the route, the operation proceeds to step S19, but the operation proceeds to step S4 otherwise.

In step S19, an area surrounding the POI determined to be present within the predetermined distance in step S17 and an area surrounding the road extending from the route to the POI, which has been determined to connect with the route in step S18, are selected over a range corresponding to the predetermined distance as explained earlier. Then, the newly selected range is added to the slicing range set in step S3. In step S4 and steps S12 to S14, processing similar to that in the control flows executed in the map information distribution system, in the first through third embodiments is executed. As a result, the map slicing range becomes reset.

The following advantage is achieved by adopting the map information distribution system in the fourth embodiment described above.

(1) If a POI satisfying a specific requirement is present in the vicinity, the map slicing range is expanded so that the modified range includes an area ranging from the recommended route and containing the POI. The specific requirement may be set by the user, or it may relate to a specific type of facility such as a restaurant that the user is likely to wish to visit while he is driving on the recommended route at a specific estimated time point or a gas station located at a specific point at which the remaining fuel quantity becomes equal to or smaller than a predetermined value. Thus, map data that satisfy the user's needs can be provided in a timely manner.

Figure 15:
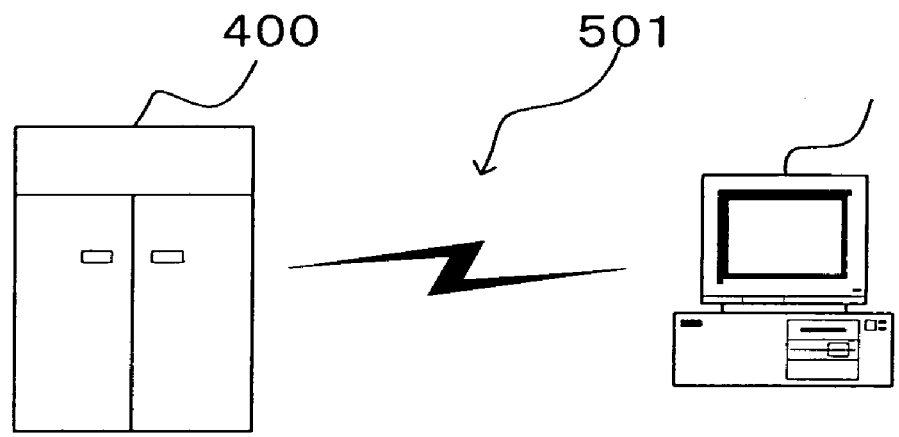
FIG. 15 shows how the present invention may be adopted in conjunction with a personal computer.

It is to be noted that the present invention may be adopted in a personal computer or the like to provide map data via a data signal on the Internet or the like. FIG. 15 shows how the present invention may be adopted in such an application. A personal computer 500 which can be connected to a communication line 501 receives the map data described above from an information distribution center 400. The information distribution center 400 has functions similar to those explained in reference to FIG. 3. The communication line 501 may be a communication line used for Internet communication or personal computer communication, or it may be a dedicated communication line. In response to a route search request received from the personal computer 500 via the communication line 501, the information distribution center 400 transmits map data related to the selected route to the personal computer 500. Namely, the map data are converted to a signal on a carrier wave that carries a transmission medium and the signal is then transmitted via the communication line 501. In this case, the map data can be distributed as a computer readable computer program product adopting any of various modes.

The embodiments described above are simply provided as examples and components other than those in the embodiments may be used as long as the features characterizing the present invention are not compromised.

The invention claimed is:

1. A map data transmission method comprising:
   determining a recommended route extending from a current position to a destination;
   extracting map data that include road shape information indicating shapes of roads and road connection information indicating conditions with which the roads connect with one another, over a slicing range set within a predetermined distance from the determined recommended route;
   making a decision as to whether or not the road connection information is to be eliminated from the extracted map data based on:
   (1) whether the extracted map data correspond to:
       a) an urban area,
       b) an area with good GPS reception, or
       c) a road which does not connect with the recommended route;
   or (2) whether an estimated total data size of the extracted ma data is greater than a predetermined value; and
   transmitting the road shape information of the roads without corresponding road connection information if results of the decision indicate that the road connection information is to be eliminated.

2. A map data transmission method according to claim 1, wherein:
   geographical conditions are set for the map data; and
   the decision as to whether or not the road connection information is to be eliminated from the extracted map data is made based upon the geographical conditions having been set.

3. A map data transmission method according to claim 2, wherein:
   the geographical conditions include an urban area; and
   a decision is made to eliminate the road connection information if the extracted map data are not corresponding to the urban area.

4. A map data transmission method according to claim 2, wherein:
   the geographical conditions include an area with good GPS reception; and
   a decision is made to eliminate the road connection information if the extracted map data are corresponding to the area with good GPS reception.

5. A map data transmission method according to claim 1, wherein:
   if the extracted map data include road data related to a road which does not connect with the recommended route, a decision is made to eliminate the road connection information corresponding to the road data.

6. A map data transmission method according to claim 1, wherein:
   a distance from the current position to the destination on the determined recommended route is calculated;
   a total data size of the extracted map data is estimated based upon the calculated distance; and
   a decision is made to eliminate the road connection information if the estimated total data size is greater than a predetermined value.

7. A map data transmission method according to claim 1, wherein:
   information indicating that the road connection information has been eliminated is attached to the transmitted map data.

8. A map data transmission method according to claim 1, further comprising:
   extracting map data that include road shape information indicating a shape of a road over a slicing range set within a predetermined distance from the determined recommended route;
   making a decision as to whether or not part of the road shape information is to be eliminated from the extracted map data; and
   transmitting a remaining part of the road shape information corresponding to the road obtained by eliminating part of the road shape information corresponding to the road from the extracted map data if results of the decision indicate that part of the road shape information is to be eliminated.

9. A map data transmission method according to claim 8, wherein:
   if the extracted map data include road data related to a road which does not connect with the recommended route, a decision is made to eliminate part of the road shape information corresponding to the road data.

10. A map data transmission method according to claim 8, wherein:
    a decision is made to eliminate part of the road shape information included in map data except for map data corresponding to a portion of recommended route which is located on an approaching side to a guidance point on the determined recommended route and within a predetermined distance from the guidance point.

11. A map data transmission method according to claim 8, wherein:
    a distance from the current position to the destination on the determined recommended route is calculated;
    a total data size of the extracted map data is estimated based upon the calculated distance; and
    a decision is made to eliminate part of the road shape information if the estimated total data size is greater than a predetermined value.

12. A map data transmission method according to claim 8, wherein:
information indicating that part of the road shape information has been eliminated is attached to the transmitted map data.

13. An information distribution apparatus that executes a map data transmission method according to claim 8.

14. An information distribution apparatus that executes a map data transmission method according to claim 1.

15. An information terminal at which a map is displayed by using map data transmitted from an information distribution apparatus according to claim 14, comprising:
a reception device that receives the map data; and
a display device that displays map data corresponding to the recommended route and map data contained within a specific distance from the recommended route based upon the received map data.

16. A map data transmission method according to claim 1, further comprising:
setting a slicing range within a predetermined distance from the determined recommended route;
making a decision as to whether or not a facility satisfying a specific requirement is present in an area beyond the slicing range;
resetting the slicing range by expanding the slicing range so that the slicing range includes the facility and a road connecting with the facility, if the facility is decided to be present in the area beyond the slicing range;
extracting map data over the reset slicing range; and
transmitting the extracted map data.

17. A map data transmission method according to claim 16, wherein:
the road connecting with the facility is an access road connecting the recommended route with the facility and also a return road connecting the facility with the recommended route.

18. A map data transmission method according to claim 16, wherein:
the facility satisfying the specific requirement is a specific type of facility that a user is likely to wish to use while traveling on the recommended route at a specific estimated time point.

19. A map data transmission method according to claim 16, wherein:
the specific requirement satisfied by the facility is an estimated traveling distance, an estimated time point or an estimated geographical position at which a remaining fuel quantity becomes equal to or smaller than a predetermined value while traveling on the recommended route and the facility by which the specific requirement is satisfied relates to a refueling facility.

20. An information terminal at which a map is displayed by using map data transmitted by adopting a map data transmission method according to claim 16, comprising:
a reception device that receives the map data; and
a display device that displays a road map and a facility mark within the reset slicing range based upon the received map data.

21. A map data transmission method comprising:
determining a recommended route extending from a current position to a destination;
extracting map data that include road shape information indicating shapes of roads and road connection information indicating conditions with which the roads connect with one another, over a slicing range set within a predetermined distance from the determined recommended route; and
transmitting the road shape information of the roads obtained by eliminating the road connection information corresponding to the roads from the extracted map data, if the extracted map data correspond to an area in which good GPS reception has been set.

* * * * *